United States Patent
Dörpinghaus et al.

(10) Patent No.: US 8,442,148 B2
(45) Date of Patent: May 14, 2013

(54) METHOD FOR OPTIMIZING SIGNALS WITH MULTIPLE SUBCARRIERS

(75) Inventors: Meik Dörpinghaus, Aachen (DE); Michael Faerber, Wolfratshausen (DE); Markus Jordan, Aachen (DE); Martin Senst, Moers (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 786 days.

(21) Appl. No.: 12/450,188

(22) PCT Filed: Mar. 13, 2008

(86) PCT No.: PCT/EP2008/053049
§ 371 (c)(1),
(2), (4) Date: Nov. 13, 2009

(87) PCT Pub. No.: WO2008/110616
PCT Pub. Date: Sep. 18, 2008

(65) Prior Publication Data
US 2010/0067615 A1    Mar. 18, 2010

(30) Foreign Application Priority Data
Mar. 15, 2007   (EP) .................................... 07005412

(51) Int. Cl.
*H04L 27/00*   (2006.01)
(52) U.S. Cl.
USPC ........................... 375/295; 375/260; 375/130
(58) Field of Classification Search ................... 375/295, 375/260, 130
See application file for complete search history.

(56) References Cited

U.S. PATENT DOCUMENTS
2005/0089109 A1 *   4/2005   Yun et al. ..................... 375/260

OTHER PUBLICATIONS

Schmidt H et al: "Reducing the peak to average power ratio of multicarrier signals by adaptive subcarrier selection" Universal Personal Communications, 1998. ICUPC '98. IEEE 1998 International Conference on Florence, Italy Oct. 5-9, 1998, New York, NY, USA, IEEE, US, vol. 2, Oct. 5, 1998, pp. 933-937, XP010315030; ISBN: 0-7803-5106-1 *5. Algorithm to reduce the crest factor.

Tellado-Mourela J: "Peak to Average Power Reduction for Multicarrier Modulation" Dissertation submitted to the department of Electrical Engineering and the Committee on Graduate Studies of Stanford University in partial Fulfillment of the Requirements for the Digree of Doctor of Philosophy, Sep. 1999, pp. I-XIV,1, XP001223601 * Chapter 4. PAR Reduction by Tone Reservation *.

(Continued)

*Primary Examiner* — Kenneth Lam
*Assistant Examiner* — Michael Neff
(74) *Attorney, Agent, or Firm* — Staas & Halsey LLP

(57) ABSTRACT

A method codes data in a transmitted signal. The transmitted signal comprises multiple subcarriers with orthogonal frequencies. The signals are modulated corresponding to a given subset of the subcarriers of the transmitted signal in order to encode information. The signal is modulated corresponding to least one reserved subcarrier depending on at least one optimization criterion relating to a quality of the overall transmitted signal. In order to enhance the quality of the transmitted signal, the optimization criterion depends on at least one first quantity relating to a peak-to-average-power ratio of the transmitted signal and on at least one second quantity relating to an out-of-band power of the transmitted signal.

17 Claims, 3 Drawing Sheets

OTHER PUBLICATIONS

Cosovic I et al: "A technique for sidelobe suppression in OFDM systems" Global Telecommunications Conference, 2005. GOBECOM '05. IEEE St. Louis, MO; USA Nov. 28-Dec. 2, 2005, Piscataway, NJ, USA,, IEEE, Nov. 28, 2005, pp. 204-208, XP010881287 ISBN: 0-7803-9414-3 * the whole document *.

Brandes S et al: "Sidelobe suppression in OFDM systems by insertion of cancellation carriers" Vehicular Technology Conference, 2005. VTC-2005-Fall. 2005 IEEE $62^{nd}$ Dallas, TX, USA Sep. 25-28, 2005 pp. 152-156, XP010878440 ISBN: 0-7803-9152-7 * the whole document *.

Jones D L et al: "An Active-Set Approach for OFDM PAR Reduction via Tone Reservation" IEEE Transactions on Signal Processing, IEEE Service Center, New Your, NY, US, vol. 52, No. 2, Feb. 2004, pp. 495-509, XP011105734 ISSN: 1053-587X * the whole document *.

Lampe M et al: "Reducing out-of-band emissions due to nonlinearities in OFDM systems" Vehicular Technology Conference, 1999 IEEE $49^{th}$ Houston, TX, USA May 16-20, 1999, Piscataway, NJ, USA , IEEE, US, vol. 3, May 16, 1999, pp. 2255-2259, XP010342247 , ISBN: 0-7803-5565-2 * the whole document *.

IEEE Standard for, Local and metropolitan area networks, Part 16: Air Interface for Fixed and Mobile Broadband Wireless Access Systems, Amendment 2: Physical and Medium Access, Control Layers for Combined Fixed and Mobile, Operation in Licensed Bands, and Corrigendum 1, IEEE Std 802.16e™-2005 and IEEE Std 802.16™-2004/Cor1-2005 (Amendment and Corrigendum to IEEE Std 802.16-2004).

802.11gTM, IEEE Standard for Information technology—Telecommunications and information exchange between systems—Local and metropolitan area networks—Specific requirements Part 11: Wireless LAN Medium Access Control(MAC) and Physical Layer (PHY) specifications Amendment 4: Further Higher Data Rate Extensionin the 2.4 GHz Band, IEEE Std 802.11g™-2003 (Amendment to IEEE Std 802,11™, 1999 Edition (Reaff 2003) as amended by IEEE Stds 802.11a™-1999, 802.11b™-1999, 802.11b™-1999/Cor 1-2001, and 802.11d™-2001).

* cited by examiner

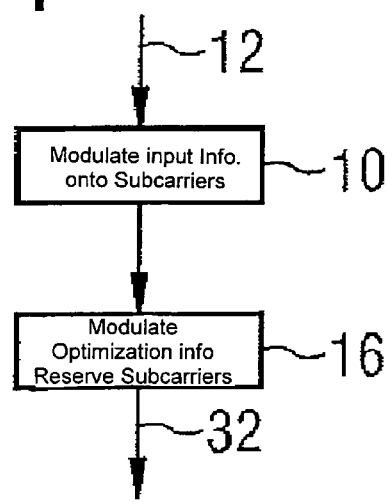
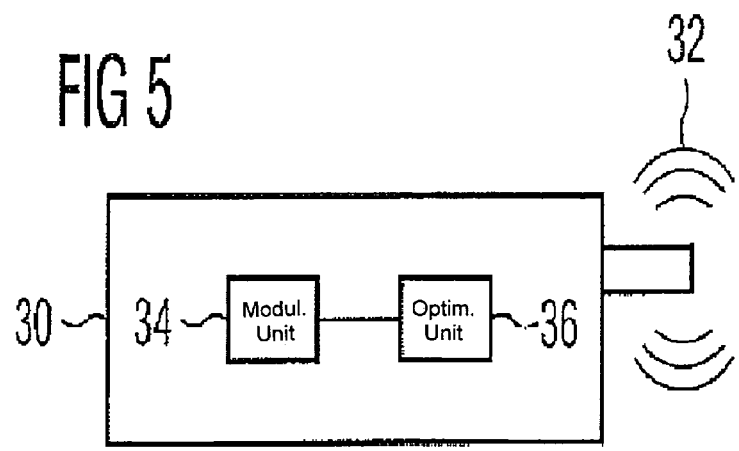

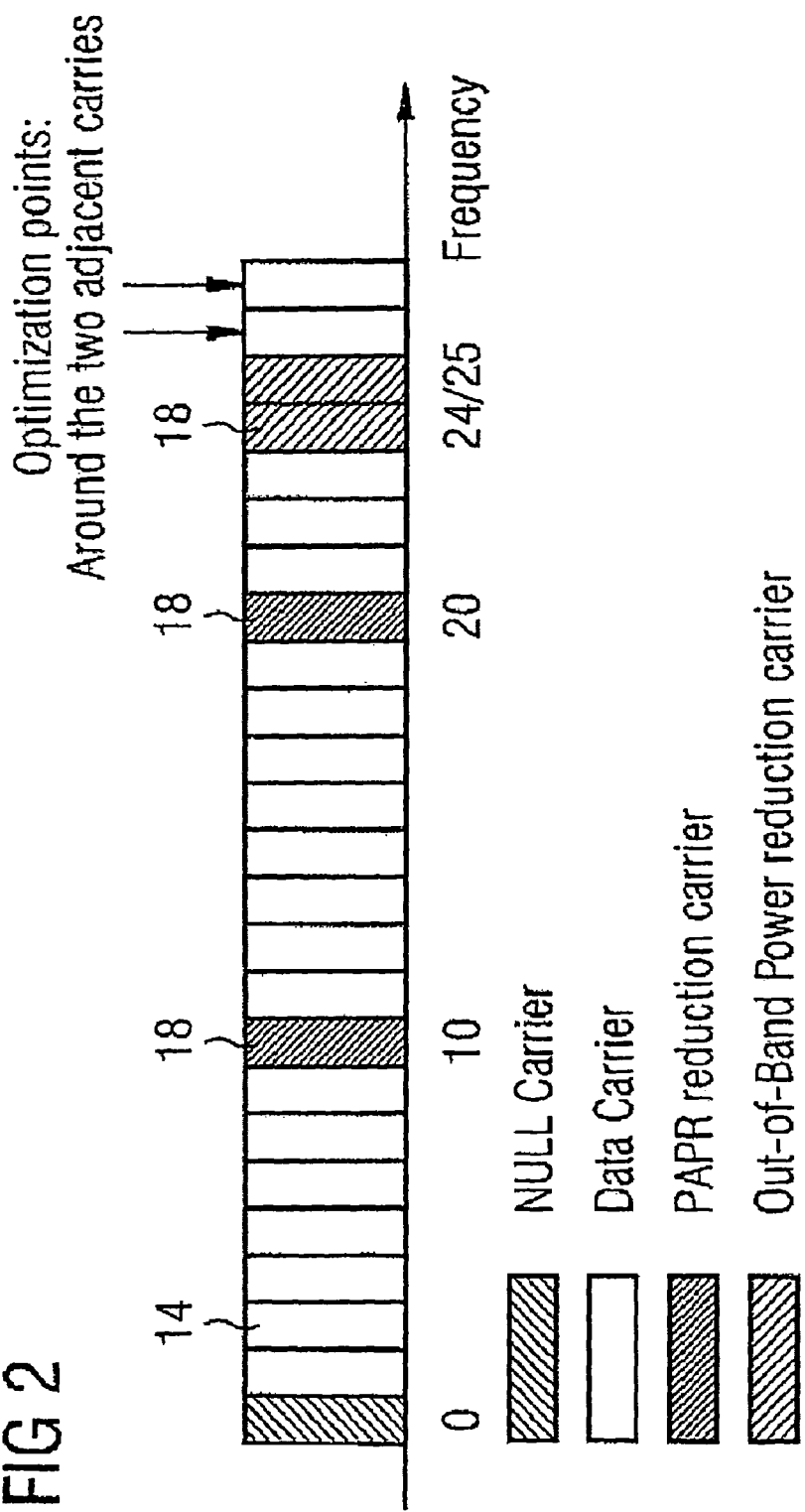

— Joint Optimization
× Separate Opt., Canc. Carriers first
+ Separate Opt., PAPR Reduction Carriers first

METHOD FOR OPTIMIZING SIGNALS WITH MULTIPLE SUBCARRIERS

CROSS REFERENCE TO RELATED APPLICATIONS

This application is based on and hereby claims priority to PCT Application No. PCT/EP2008/053049 filed on Mar. 13, 2008 and European Application No. EP07005412 filed on Mar. 15, 2007, the contents of which are hereby incorporated by reference.

BACKGROUND OF THE INVENTION

In the field of coding data in a transmitted signal, the transmitted signal may comprise multiple sub-periods with orthogonal frequencies. Data coding methods of this type are also known as "Orthogonal Frequency Division Multiplex" (OFDM) schemes, where the signal is composed of a superposition of signals corresponding to a set of sub-carriers, wherein the sub-carriers have mutually orthogonal frequencies. The frequencies are orthogonal in the sense that the time dependent functions on a support corresponding to the signal duration of the transmitted signal are orthogonal functions in the mathematical sense. The signal duration is therefore inversely proportional to the spacing of neighboring sub-carriers.

One fundamental problem that is inherent to all orthogonal frequency division multiplex systems is the high Peak-to-Average Power-Ratio (PAPR). Since the transmitted signal is a superposition of many sinusoidal signals, the time domain samples are approximately gaussian distributed, which gives rise to strong peaks. This is a problem because power amplifiers are linear only within the limited range of input power. Stronger peaks are clipped to the maximum output power. Hence, either the signal is distorted by the non-linear clipping operation or the power amplifier must operate with low average power so that even peaks are still within the linear range. This, however, leads to a poor efficiency and over-dimensioned amplifiers. It is therefore important to employ algorithms that reduce the peak to average power ratio.

The second characteristic of orthogonal frequency division multiplex signals is that the Power Spectral Density (PSD) of the transmitted signal decays quite slowly with $f^{-2}$ outside the allocated frequency range. This is due to the spectral components of the rectangular pulse corresponding to the symbol duration. The Out-of-Band-Power (OBP) therefore interferes with systems transmitting on neighboring frequency bands. Therefore, in order to reduce mutual interference between two independent systems to an acceptable level, the systems must be separated by a rather large guard interval in frequency domain. This guard interval reduces the overall spectral efficiency. In the following, we will use the term Out-of-Band-Power (OBP) for the power that is contained in the power spectral density outside the assigned frequency range. If the Out-of-Band-Power is reduced, then the guard interval between the systems could be reduced and the spectral efficiency could be increased.

Due to the importance of Peak-to-Average-Power-Ratio reduction, many algorithms have been proposed in literature. Many of these algorithms, however, suffer from the fact that side information needs to be transmitted to the receiver. For instance, one could employ several different interleavers, each of which giving rise to a different time domain signal. Then the signal with the lower Peak-to-Average-Power-Ratio is chosen. The receiver of cause needs to know which interleaver was used. Not only leads the additional transmission of the side information to the decrease of spectral efficiency, but this data is very important because an error in the side information can lead to a complete loss of the orthogonal frequency division multiplex symbol.

Another Peak-to-Average-Power-Ratio reduction algorithm is proposed by Tellado in his PHD theses (Tellado, "Peak-to-Average-Power Reduction for Multi-carrier Modulation"). This algorithm does not suffer from the latter drawback. He proposes to reserve a set of sub-carriers for the sole purpose of Peak-to-Average-Power-Ratio reduction: these carriers, called Reserved Tones (RT), are referred to as reserved sub-carriers in the following. The reserved sub-carriers do not carry any data, but are modulated such that the Peak-to-Average-Power-Ratio of the resulting time signal is minimized. This method yields of course a reduction of spectral efficiency, but since the reserved sub-carriers do not carry any data, the system is not vulnerable to loss of side information. In fact, if the channel is slowly varying and the transmitter has channel state information, the reserved sub-carriers could be scheduled on sub-carriers that are in a deep fade, where data transmission would be impossible anyway. The sub-carrier reservation method has found its way into the WIMAX standard, which shows that this algorithm is indeed of practical interest.

For the problem of Out-of-Band-Power-Reduction, there is also a technique proposed by Brandes (Brandes, Cosovic, Schnell, "Sidelobe Suppression in OFDM Systems by Insertion of Cancellation Carriers"), which is based on reserved tones. These tones are sub-carriers, in the aforementioned paper called Cancellation Carriers (CC) are located at the edges of the spectrum and are modulated such that their spectra approximately cancel the spectra of the data carriers, resulting in the reduction of Out-of-Band-Power of the total orthogonal frequency division multiplex signal.

The above described problems occur in particular in OFDM(A) based Systems. Such Systems are suffering in mobile scenarios uplink connections, by the imperfect time synchronization of the different allocated chunks. The multitude of mobile terminals have slight but notable frequency offsets, which violates the orthogonal nature of the OFDMA signal at the base station receiver.

Typical examples for OFDM(A) based uplink system concepts are the IEEE 802.16 standard (WiMax), 802.11g, or proprietary concepts like Flash-OFDM.

The multitone modulation itself puts a significant requirement on the power amplifier design, namely in the need of a back off, which reduces the PA efficiency, or achievable output power. For both problems individual solutions already exist to reduce the unwanted effects, by using cancellation carriers or reserved tones. However the cancellation carriers are dedicated for a single use to day, to achieve the wanted effect.

OFDM Modulation puts a significant requirement on the power amplifier design, namely in form of a back off, which reduces the PA efficiency, or achievable output power.

Peak to average power ratio (PAPR) is a measure which describes the required linearity of a transmitter to transmit signals with multi-code or multi-tone characteristic and is also dependent on the used modulation schemes. The aim is to generate a signal w/o significant distortion, therefore avoiding degradations in the Signal-to-Noise-Ratio (SNIR) required at the receiver.

Therefore, the PAPR describes the needed linearity especially of the power amplifier to achieve a good link performance. The linearity is achieved by introducing a back off from the PA saturation point, commonly known as the 1 dB compression point, about a certain amount of dB. The magnitude of this back off depends on the used modulation scheme and the multi-code or multi tone characteristic of the system concept. The back off improves the linearity of the PA on the cost of higher power consumption, or a reduced maximum transmission power.

From a mobile terminal point of view, large power back offs are reducing the achievable range, or if the range is maintained the PA linearity causes a high power consumption and shorten the battery life time significantly. This effect on increased transmitter design complexity and power demand mounts up in system concepts which are utilizing balanced Multiple Input Multiple Output (MIMO) concepts as e.g. 2×2 MIMO, which requires the presence of two transmitters in the terminal. Complex transmitter designs and high power consumption are duplicated.

Systems with OFDMA multi carrier transmission are suffering on the PAPR effects in the uplink. Especially if mobile terminals are being used the effect on the battery life time is negative. There are concepts to reduce the PAPR by cancellation carriers which are using reserved tones. Tone reservation dedicates specific subcarriers to be used for something different than the user data transport. Usually, the user data is mapped to a plurality of subcarriers and is segmented into time intervals, comprising resource block units.

Tone reservation is performed in such a way that additional subcarriers are added to the resource block (or subcarriers of a resource block are being removed from the MAC as carriers bearing user data and getting a reserved status), where the reserved tones have a modulation which does not depend on user data. The modulation is controlled by the output signal and if the peak power is going to exceed a certain threshold, the modulation of the reserved tones is chosen in such a manner that the PAPR is decreased. Depending on the implemented complexity, PAPR reductions of about 3 dB and higher can be achieved, which in terms of power consumption and achievable range is a big step.

The associated disadvantage is that the spectral efficiency is lowered because of the reservation of subcarriers with the only purpose of PAPR reduction. To utilize the result of the PAPR reduction in the cell range, the improved performance is used to increase the average power i.e. utilization of the amplifier closer to the saturation point. The known method [Brandes, S., Cosovic, I., Schnell, M., "Sidelobe Suppression in OFDM Systems by Insertion of Cancellation Carriers"] to combat these effects is also a tone reservation, however the modulation of the reserved subcarriers is performed in such a manner that the spectral mask gets steeper and the power spill over into adjacent resource blocks is reduced by up to 20 dB. The procedure can be feedback based: using the input data, the resulting output spectrum is processed to derive the parameters for the modulation of the reserved tones. An alternative implementation is a statistical approach producing modulation patterns which are reducing the constructive addition of the tones.

The associated disadvantage of this method is an increase of the PAPR. However, as long as the range is not a point, and spectral efficiency and protection of adjacent bands and resource blocks is the objective, the method is very successful. The side lobe suppression shows best performance when the cancellation carriers are allocated at the chunks edges as the most outer tones.

Today methods are known to reduce PAPR or to reduce adjacent channel power by tone reservation, however exclusively for the one or the other problem, with the result that for each optimization the position of the cancellation carriers should be different.

SUMMARY

One potential object of the inventors was to find a method and apparatus that allows for both a highly efficient out-of-band power suppression and a Peak-to-Average-Power Reduction.

A further potential object was to provide optimization in the system design, by optimizing the system in using a dynamic allocation of cancellation carriers.

The inventors propose a method for coding data, in particular multiple access data, in a multiplexed transmitted signal is proposed, wherein the transmitted signal comprises multiple subcarriers with orthogonal frequencies. The method favorably comprises the step of modulating the signals corresponding to a given subset of the subcarriers of the transmitted signal in order to encode information.

Moreover, the method may comprise the step of modulating the signal corresponding to least one reserved subcarrier depending on at least one optimization criterion relating to a quality of the overall transmitted signal. The quality of the signal may be determined depending on the PAPR or on the OBP.

In order to achieve a highly effective joint reduction of envelope fluctuations (PAPR) and of Out-of-Band-Power, it is proposed that the optimization criterion depends on at least one first quantity relating to a peak-to-average-power ratio of the transmitted signal and on at least one second quantity relating to an out-of-band power of the transmitted signal.

According to a further aspect, the reserved subcarriers are distributed over the available bandwidth of the transmitted signal. In comparison to embodiments where the reserved subcarriers are concentrated on a part of the band, a more effective cancellation may be achieved.

If the subcarriers of the transmitted signal are comprised in a band of subcarriers, wherein at least one subcarrier at each edge of the band of subcarriers is a reserved subcarrier, a particularly effective Out-of-Band-Power reduction can be achieved. This is due to the fact that the subcarriers on the band edges are especially effective in the sidelobe suppression. In particular if at least two neighboring subcarriers at an edge of the band are reserved subcarriers, the Out-of-Band-Power (OBP) can be strongly reduced.

A high spectral efficiency can be achieved, if a Quadrature Phase Shift Keying (QPSK) is used for modulating the signals of the subset of subcarriers carrying the information. The QPSK allows transmitting two bits of data per subcarrier and per symbol.

According to a further aspect, it is proposed that optimization is performed under the constraint that the power allocated to the at least one reserved subcarrier is limited to a first preset constant. This avoids a "runaway" of the power allocated to the reserved subcarriers in the optimization.

An explicit choice of the preset constant depending on the total number of subcarriers and/or on the average power allocated to the subcarriers may be avoided if the first preset constant corresponds to the number of reserved subcarriers multiplied with an average power allocated to one of the subcarriers of the subset of subcarriers carrying the information.

According to a further aspect, the optimization is performed under the constraint that the power allocated one reserved subcarrier is limited to a second preset constant. This avoids a divergence of the optimization method.

An explicit choice of the preset constant depending on the total number of subcarriers and/or on the average power allocated to the subcarriers may be avoided if the second preset constant corresponds to two times an average power allocated to one of the subcarriers of the subset of subcarriers carrying the information.

The optimization can be achieved using numerically well tested algorithms, if the optimization is performed by finding an extremum of a weighted sum of the first quantity and the second quantity. Depending on the sign of the optimization function, the extremum may be a maximum or a minimum.

If in the weighted sum a weight of the first quantity and a weight of the second quantity are selected depending on at least one parameter relating to a current situation, the method may be easily adapted to the circumstances. If for example the guard interval between frequency bands of different systems is particularly large and at the same time, a power amplifier is of poor quality, the weight could be shifted to the first quantity relating to the Peak-to-Average-Power Reduction, since due to the large guard interval, the sidelobe suppression is less essential. On the other hand, if a high quality power amplifier is applied and at the same time there are many other systems transmitting on neighboring frequency bands, the weight could be shifted towards the second parameter relating to the Out-of-Band-Power reduction. Parameters describing the circumstances where the method is applied could e.g. be the maximum linear range of the power amplifier or the width of the guard interval.

In a further embodiment the optimization might also comprise varying the weight of the first quantity and the weight of the second quantity.

In the simplest form, the first quantity relating to the peak-to-average-power ratio is a maximum power of the signal to be transmitted. Alternatively, e.g. an average of several maxima of the transmitted signal might be used.

In a very simple and effective embodiment, the second quantity relating to the out-of-band power of the transmitted signal is determined dependent on a power of the signal to be transmitted in at least one optimization-point-frequency outside a band of frequencies assigned to the subcarriers of the transmitted signal. A good Out-of-Band-Power reduction may be achieve, if the second quantity is determined dependent on an average power of at least two frequencies of the transmitted signal.

A further important aspect is based on the discovery that the position of the cancellation carriers or reserved tones in the chunk of the available bandwidth is significantly influencing the performance. To achieve best results for the PAPR reduction, positions within the chunk are preferable since PAPR reduction maintains the level of spectral spill over constant by increased usable TX power. However, the PAPR reduction does in this case not result in a tighter spectral mask. The spectral mask can be maintained, but with the difference that a higher output power can be achieved compared to conventional terminals.

In operational scenarios, where range is the crucial issue and not the capacity, the spectral efficiency loss by tone reservation and necessary guard bands due to the PA caused spectral growth is secondary. The primary objective is to reduce the PAPR and to enable higher sustained PA output power, not improving the spectral mask.

Another operational scenario is the high capacity scenario, where the range requirements are short, but the spectrum efficiency shall be optimal. OFDMA in the UL shows here some system inherent effects. The OFDMA signal at the BTS receiver is compiled by a multitude of OFDM signals from various mobile stations. The mobile stations have an imperfect synchronization. Even though they derive their time base from network, delay times, signal jitter, and the limitations of the local oscillators add an error to the signal. These errors of the individual OFDM signals are causing an imperfect demodulation in the BTS receiver, because the signal of adjacent subcarriers would not be perceived as zero at the detector, and a power spill from the adjacent subcarrier is reducing the SINR performance.

This effect is getting more critical when the terminals have different positions in the cell, and the powers of different OFDM signals seen at the receiver have significant power differences. In such cases, e.g. on random access channels, packet transmission re-activation, or sub-optimal power control, the power spill over may mask wanted signals.

In order to overcome these problems, it is proposed to introduce a dynamic cancellation carrier allocation instead of a predefined allocation of the cancellation carriers or reserved tones. This Idea applies in particular to systems with OFDM (A) based UL. The dynamic cancellation carrier allocation allows an individual customization of a terminal connected to a network by a base station.

Such a generic concept requires that terminals can support tone reservation for PAPR and/or sideband reduction.

The research of the inventors has shown, that the use of cancellation carriers aiming to combat both effects simultaneously is performing better results, as dealing the effects individually or in a sequential process.

According to the needs an algorithm can optimize, i.e. trade off the effects, e.g. depending on the range the terminal is apart from the base station. As described above, this joint optimization exceeds the solution to switch the cancellation carriers from one purpose to another.

However as previously mentioned, there is no ideal position of cancellation carriers within a chunk which suites best for both purposes. By a dedicated signaling, the network respectively the scheduler sent information to a dedicated terminal about the number and positions of cancellation carriers.

If for example the PAPR improvement is not interesting, because the terminal is close to the base station, the scheduler dedicates cancellation carriers to the band edges to achieve optimum side lobe suppression. In the opposite in range limited scenarios, the scheduler select positions of the cancellation carriers in the chunk which allows best back off reduction.

In the operational cases the system benefits from both, depending on the effect with dominant weight, the scheduler signals a combination of cancellation carrier positions on chunk edges and in the chunk. The signaling may be performed in the form of a map, addressing tone positions by a numbering, and in a second dimension defining the max. usable power per tone.

Accordingly, the inventors' proposals introduce a dedicated signaling between the network and individual terminal depending on the link quality, capacity needs and terminal position. It is proposed to implement this by allocating the tones flexible in position and power share, resulting in a fine granularity for trading off the side lobe and power back off performance.

In other words, it is proposed to add the step of determining a position of the at least one reserved subcarrier within a bandwidth of the transmitted signal depending on an optimization criterion, which optimization criterion could be used for a separate optimization procedure or for a joint optimization procedure including optimizing the signal of the cancellation carriers or reserved tones.

In particular, the position may be determined based on weight factors describing the weight of the first quantity and of the second quantity in the optimization criterion. The thus determined position of the at least one reserved subcarrier may be signaled to the receiver together with the transmitted signal.

Moreover, it is proposed to not only determine the position of the reserved subcarriers dynamically but to also determine a number of reserved subcarriers/cancellation carriers. The different requirements for long-range and high capacity signaling may be taken into account if the latter parameters are determined based on at least a distance between a signal transmitter transmitting the transmitted signal (32) and a station receiving the transmitted signal.

According to a further aspect of the proposal, a signal transmitter for transmitting and coding multiple access data in a multiplexed transmitted signal is proposed, wherein the transmitted signal comprises in particular multiple subcarriers with orthogonal frequencies. The signal transmitter may favorably comprise a modulating unit for modulating the signals corresponding to a given subset of the subcarriers of the transmitted signal in order to encode information. The modulating unit is further suitable for modulating the signal corresponding to least one reserved subcarrier depending on at least one optimization criterion relating to a quality of the overall transmitted signal.

According to one aspect, it is proposed that the signal transmitter is provided with an optimizing unit configured to optimize the overall transmitted signal using an optimization criterion depending on at least one first quantity relating to a peak-to-average-power ratio of the transmitted signal and on at least one second quantity relating to an out-of-band power of the transmitted signal.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows schematically an embodiment of a method for coding multiple access data to be transmitted by use of a multiple access data transmitting system.

FIG. 2 is an illustration of the distribution of data carrying subcarriers and reserved subcarriers over an available bandwidth.

FIG. 5 shows schematically a signal transmitter for transmitting and coding multiple access data.

DETAILED DESCRIPTION OF THE PREFERRED EMBODIMENT

Figure 3:
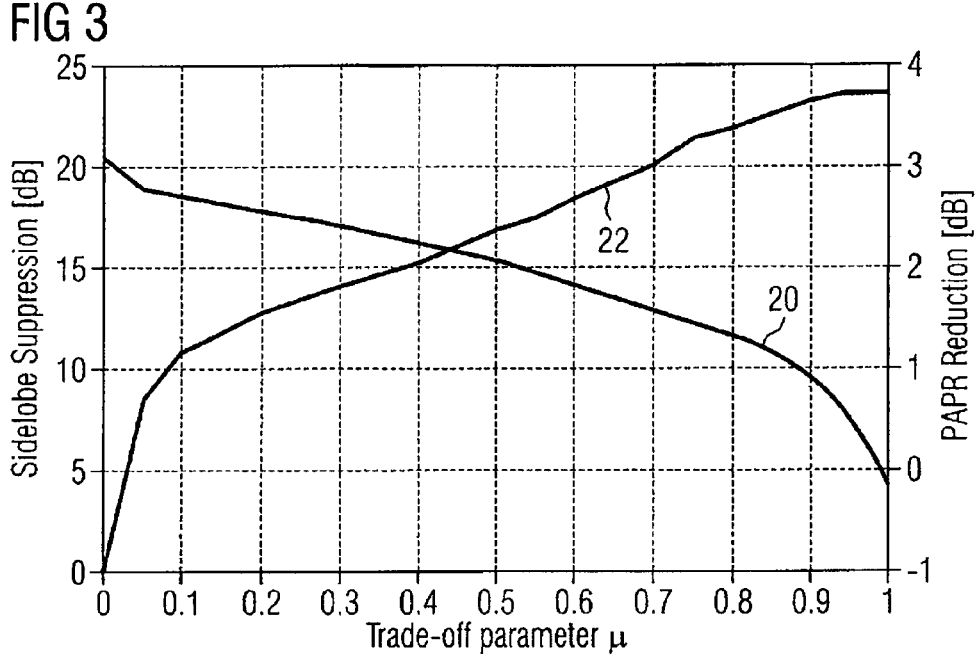
FIG. 3 is a graph showing the out-of-band-power suppression and a Peak-to-Average-Power-Reduction versus a trade-off parameter.

Reference will now be made in detail to the preferred embodiments of the present invention, examples of which are illustrated in the accompanying drawings, wherein like reference numerals refer to like elements throughout.

FIG. 1 shows schematically an embodiment of a method for coding data to be transmitted by use of a multiple access data transmitting system. The method is suitable for coding data to be transmitted in a signal, wherein the transmitted signal comprises multiple subcarriers with orthogonal frequencies.

In a first step 10, information 12 is input and the signals corresponding to a given subset of the subcarriers 14 (FIG. 2) of the transmitted signal are modulated in order to encode the information 12.

The keying scheme applied in the first step is Quadrature Phase Shift Keying is used for modulating the signals of the subset of subcarriers 14 carrying the information 12.

In a second step 16, the signal corresponding to least a set of reserved subcarriers 18 (see FIG. 2) is modulated depending on at least one optimization criterion relating to a quality of the overall transmitted signal. The overall signal is composed as a linear superposition of the signals corresponding to the information carrying subcarriers 14 and of the signals corresponding to the reserved subcarriers 18.

The optimization criterion depends on one first quantity relating to a peak-to-average-power ratio of the transmitted signal and on one second quantity relating to an out-of-band power of the transmitted signal.

FIG. 2 is an illustration of the distribution of data carrying subcarriers 14 and reserved subcarriers 18 over an available bandwidth. Due to the symmetry, only the right half of the spectrum is depicted. Please keep in mind that the differentiation between PAPR reduction tones and out-of-band power only applies to the scenario with two separate optimization steps. The subcarriers of the transmitted signal are comprised in a band of subcarriers, wherein neighboring subcarriers at an edge of the band are reserved subcarriers 18. The remaining reserved subcarriers 18 are distributed over the available bandwidth of the transmitted signal.

Instead of defining one set of cancellation carriers (at the edges of the spectrum) for the OBP reduction and one set of PAPR reduction carriers (distributed inside the spectrum), according to one aspect it is proposed to take only one set of subcarriers 18, in the following called Reserved Tones (RTs) or reserved subcarriers 18, and modulate them in a way that both the out-of-band power and the PAPR are minimized simultaneously.

However, in order to enhance the comprehensibility, the mathematical background is described in the following using an example where only the BOP is minimized.

Let $S_k(f)$ denote the spectrum of the k-th subcarrier, and $S(f)=\Sigma S_k(f)$ the spectrum of the total OFDM symbol. Our aim is then to determine the weights of the reserved subcarriers so that the expression $\int |S(f)|^2 df$ is minimized, where the integral goes over the frequencies outside the band occupied by our signal.

Since the evaluation of the whole integral is numerically infeasible, a discrete set V of frequencies is selected, where the power is to be minimized. These points should be chosen to lie around the first few sidelobes left and right of the spectrum.

In the following, the variable $v=(f-f_c)/\Delta f$ denotes the normalized frequency, i.e. $v=0$ is the DC frequency bin, and the data carriers are centered at $v=\pm 1, \pm 2, \ldots$.

The objective function of our optimization problem relating to the sidelobe suppression only then becomes $$\sum_{v \in V} |S(v)|^2.$$

In order to derive an expression for S(v), let us first consider a single unmodulated subcarrier. The discrete time signal of the k-th tone can be written as $$s_k(n) = \frac{1}{N_C}\exp(2\pi jnk/N_C), \quad (1)$$

$$-N_{cp} \le n \le N_C - 1.$$

where $N_{cp}$ is the length of the cyclic prefix. The corresponding continuous frequency spectrum is $$S_k(v) = \frac{1}{N_C}\sum_{n=-N_{cp}}^{N_C-1}\exp(2\pi jnk/N_C)\exp(-2\pi jvn/N_C) \quad (2)$$

$$= \frac{1}{N_C}\sum_{n=-N_{cp}}^{N_C-1}\exp(-2\pi j(v-k)n/N_C).$$

With the Dirichlet function $$D_N(x) = \frac{\sin(Nx/2)}{N\sin(x/2)}$$

and $N_s = N_C + N_{cp}$ denoting the total symbol duration, (2) can be written as $$S_k(v) = \frac{N_s}{N_C}D_{N_s}(2\pi(v-k)/N_C)\exp\left(-\pi j(v-k)\frac{N_C - N_{cp} - 1}{N_C}\right). \quad (3)$$

With (3) we can calculate the spectrum of the data carriers at the optimization points $v \in V$ which will be denoted as b. Furthermore, we can write the spectrum of the CCs at the optimization points as the linear mapping AX where A is a $|V| \times R$ matrix and X is, as above, the vector containing the weights of the reserved tones.

The out-of-band power (OBP) that we wish to minimize is then given as the squared Euclidian norm denoted by $\|\ \|_2^2$ $$OBP(AX+b) = \|AX+b\|_2^2. \quad (4)$$

It suffices to minimize the objective function $\|AX+b\|_2$.

If $N_{cp} > 0$, and hence $N_s > N_C$, as is usually the case in OFDM systems, the subcarrier spectra become narrower as the symbol duration becomes longer. This means that the zeros of subcarrier $v_0$ are not at $v_0 \pm 1, v_0 \pm 2 \ldots$ any longer but at $v_0 + z$, $v_0 \pm 2z \ldots$ with $z = N_C/N_s$. In the receiver, the cyclic prefix is removed and orthogonality between the subcarriers is restored.

We mention this fact because when we want to reduce the out-of-band power, we have to differentiate between two different goals:

First, we might want to reduce the power of the transmitted signal within a certain frequency interval. This is the context in which Brandes et al. proposed the cancellation carrier technique; their goal is to operate the OFDM system as an overlay system which uses a frequency range already occupied by narrowband legacy systems. In order to not interfere with these narrowband systems too heavily, the transmitted signal must contain as little power as possible within the respective frequency band.

We are interested in minimizing the self-interference caused by Doppler spread or bad synchronization. In this scenario, we want to minimize the out-of-band power of the received signal after CP removal.

The difference is that in the first case, we have to take the CP into account when calculating the spectra, i.e. the parameters A and b. In the second case, $N_{cp}$ must be set to zero.

We will now turn to the method where the Out-of-Band-Power reduction and the PAPR is performed simultaneously. While the term $\|AX+b\|_2$ may—as described above—be used as second quantity relating to an out-of-band power OBP of the transmitted signal, in the below example, the quantity $\|CX+d\|_\infty$ is used as a first quantity describing the Peak-to-Average-Power Ratio PAPR of the signal. The function $\|\ldots\|_\infty$ denotes the maximum component of the vector being the argument of the function. In other words, first quantity $\|CX+d\|_\infty$ relating to the peak-to-average-power ratio is a maximum power of the signal to be transmitted.

According to the above example, second quantity $\|AX+b\|_2$ relating to the out-of-band power of the transmitted signal is determined dependent on a power of the signal to be transmitted in several optimization-point-frequencies outside a band of frequencies assigned to the subcarriers of the transmitted signal. An average power of the optimization-point-frequencies is implicitly performed in the matrix multiplication.

Therefore, the problem may be formulated as to minimize the vector-valued objective function $$f_0(X) = \begin{pmatrix} \|AX+b\|_2 \\ \|CX+d\|_\infty \end{pmatrix}. \quad (5)$$

By multiplying equation (5) with a two-dimensional weighting vector $\lambda$, we transform the objective function into a scalar valued one. Note that norms are convex functions and hence $\lambda^T f_0(X)$ is a convex function. Its minimum can therefore be found by standard optimization algorithms.

If we solve the unconstrained optimization problem, for some OFDM symbols the RTs or reserved subcarriers will be allocated much more power than the corresponding amount of data carriers. Since an increase of total transmit power is not an option in most systems, the power of the total symbol (including the RTs) has to be normalized, which means that the power on the data carriers is reduced if the RTs carry more power than the data carriers. Of course, this is only acceptable up to a certain degree since the BER increases with decreasing data carrier power.

Furthermore, if each OFDM symbol is normalized with a different normalization factor, we can say that the amplitude of the effective channel varies from symbol to symbol. This is a problem if constellation schemes like QAM, where amplitude carries information, are used, because averaging the channel estimate in time direction is not possible anymore without severely degrading the MSE of the estimation.

We therefore introduce two constraints on $X$: $\|X\|_\infty^2 \le P_{corr}$, ensures that the power of each RT does not exceed $P_{carrier}$, which prevents spectral power peaks. The second constraint $\|X\|_2^2 \le P_{total}$ limits the total amount of power that is allocated to the RTs.

In other words, the optimization is performed under the constraint that the power allocated to the total number of reserved subcarriers is limited to a first preset constant $P_{total}$, wherein first preset constant $P_{total}$ corresponds to the number of reserved subcarriers multiplied with an average power allocated to one of the subcarriers of the subset of subcarriers carrying the information.

As a second constraint, the optimization is performed such that that the power allocated one reserved subcarrier is limited to a second preset constant $P_{carrier}$. According to one embodiment, second preset constant $P_{carrier}$ corresponds to two times an average power allocated to one of the subcarriers of the subset of subcarriers carrying the information.

The optimization problem can now be formulated as follows:

$$\text{minimize} \quad \lambda^T \begin{pmatrix} \|AX + b\|_2 \\ \|CX + d\|_\infty \end{pmatrix} \quad (6)$$

$$\text{subject to} \quad \|X\|_\infty^2 \le P_{carrier}$$

$$\|X\|_2^2 \le P_{total}$$

We stress that the constraint functions are also convex, and hence (6) can be solved by convex optimization algorithms. The optimization is performed by finding an extremum of a weighted sum of the first quantity $\|CX+d\|_\infty$ relating to the peak-to-average-power ratio and of the second quantity $\|AX+b\|_2$ relating to the OBP.

The weighting vector is chosen as $$\lambda = \begin{pmatrix} \kappa\mu \\ 1-\mu \end{pmatrix}. \quad (7)$$

With the trade-off parameter $\mu\epsilon[0,1]$ we can smoothly adjust the relative weighting of the two optimization criteria: $\mu$ close to zero yields a strong PAPR reduction, while $\mu$ close to one emphasizes the out-of-band power reduction.

In particular, the weight $\kappa\mu$ of the first quantity and a weight $1-\mu$ of the second quantity may be selected depending on at least one parameter relating to a current situation by simply determining the parameter $\mu$ in a suitable way.

The constant $\kappa=\|d\|_\infty/\|b\|_2$ is strictly speaking not necessary; its only purpose is to scale the $\mu$-axis such that that for $\mu=0.5$, the two optimization criteria are approximately equally weighted.

FIG. 3 is a graph showing a first curve 20 describing the Out-of-Band-Power suppression and a second curve 22 describing the Peak-to-Average-Power-Reduction versus a trade-off parameter. The graph of FIG. 3 is the result of a numerical simulation which has shown that the joint optimization indeed promises a better performance compared to two separate optimization steps, while providing the system designer with a higher degree of flexibility.

The simulation parameters resulting in the improvements shown in FIG. 3 are as follows:

FFT-length $N_C$=64

No cyclic prefix;

50 modulated subcarriers on normalized frequencies [±1, ±2, . . . ±25]

QPSK modulation

Reserved Tones on carriers [±10,±20,±24,±25]. In the main simulation, these carriers are used jointly for both PAPR reduction and out-of-band power reduction. In the simulations provided for comparison where two separate optimization steps are performed, the carriers [±10,+20] are used for PAPR reduction, and the carriers [±24,±25] are used for out-of-band power reduction. The positions of the PAPR reduction carriers are chosen arbitrarily here and may in general be chosen in any suitable way depending on the specific circumstances The PAPR is evaluated using a 4-times oversampled time domain signal, The out-of-band power is evaluated as $\int_{25.5<|v|<N_C/2} |S(v)|^2 dv$. Note that the spectrum of the discrete-time signal is periodic with period length $v_0=N_C=64$ Under the assumption that the data carriers are normalized to an average power of 1, we set the constraint constants to $P_{carrier}=2$ and $P_{total}=R=8$. The first constraint ensures that the reserved tones are not more than 3 dB stronger than the data carriers, and the second constraint makes sure that on average, the RTs are not allocated more power than the data carriers, which makes a power normalization unnecessary. Accordingly, in the comparison simulation where two separate optimization steps are performed, $P_{total}$ is set to 4 in both steps.

In the example of FIG. 3, both PAPR reduction and out-of-band power reduction are evaluated by comparison with a reference signal with 50 data carriers. We can observe the smooth trade-off that is achievable by varying $\mu$.

Figure 4:
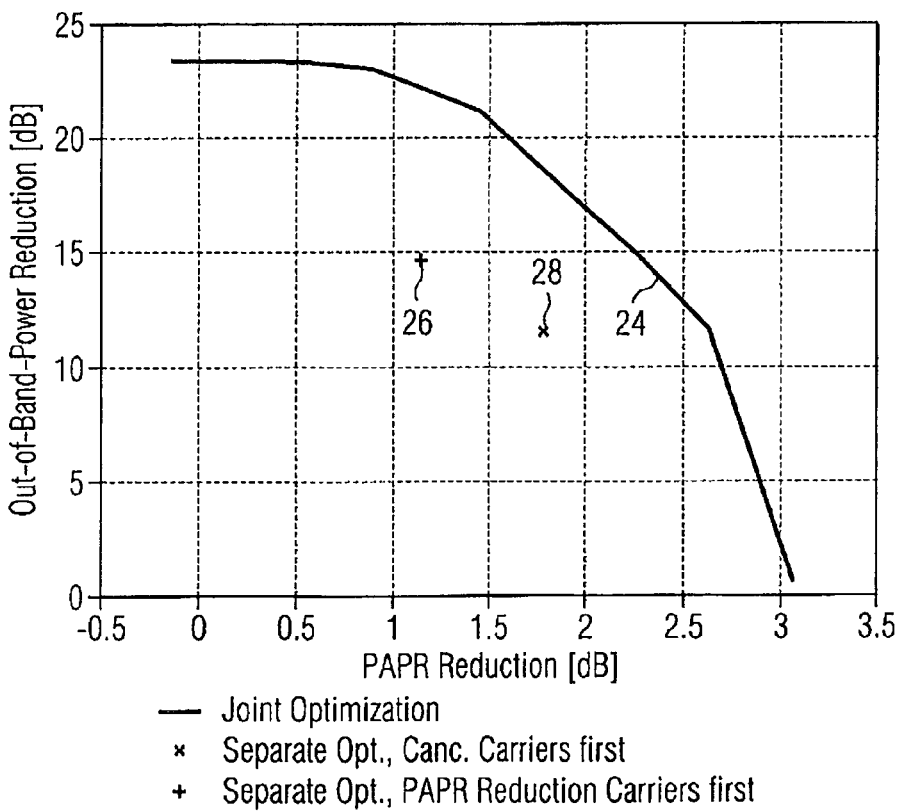
FIG. 4 illustrates a trade-off curve achieved with joint optimization and corresponding achievable points with separate optimization.

FIG. 4 illustrates a trade-off curve 24 achieved with joint optimization and corresponding achievable points 26, 28 with separate optimization. The reduction achieved by separate optimization steps is shown for comparison. The only degree of freedom we have in the latter case of separate optimization steps is the order of the two steps. We see that the "more important" optimization should be performed in the second step, because then the respective algorithms can take the reserved carriers from the first optimization step into account. We can furthermore observe that the reduction that can be achieved by separate optimization is far worse than the results of the proposed joint optimization.

FIG. 5 shows schematically a signal transmitter 30 for transmitting and coding data in a transmitted signal 32, wherein the transmitted signal 32 comprises multiple subcarriers with orthogonal frequencies (cf. FIG. 2). The signal transmitter 30 may be included in a mobile phone or e.g. in a broadcast system.

The signal transmitter 30 comprises a modulating unit 34 for modulating the signals corresponding to a given subset of the subcarriers of the transmitted signal in order to encode information and for modulating the signal corresponding to least one reserved subcarrier depending on at least one optimization criterion relating to a quality of the overall transmitted signal 32.

The signal transmitter 30 further comprises an optimizing unit 36 configured to optimize the overall transmitted signal 32 using an optimization criterion depending on at least one first quantity relating to a peak-to-average-power ratio of the transmitted signal 32 and on at least one second quantity relating to an out-of-band power of the transmitted signal 32.

According to further embodiments, the optimizing unit 36 further varies the number and positions of the reserved subcarriers 18 (see FIG. 2) dynamically depending on the instantaneous requirements, in particular depending on a distance between the sender and the receiver, on the link quality and on the capacity needs.

Moreover, the power share between the subcarriers may be determined by the optimizing unit and the maximum usable power per reserved tone may be signaled together with the positions of the reserved tones to the downlink components of the network.

The optimizing unit 36 may further be configured to inform a scheduler of the network of the positions and of the number of reserves subcarriers. The optimization may be performed independently for a first group of reserved subcarriers near the edges of the available bandwidth in order to reduce frequency spill over and for a second group of reserved subcarriers distributed in the chunk of the signal bandwidth.

It is noted that the idea of the dynamical allocation of the reserved subcarriers is not limited to the joint optimization with regard to PAPR reduction and sidelobe suppression but could also be used to optimize the signal with regard to only one of these criteria.

Moreover it is noted that the optimization could also be performed by only determining the number of reserved subcarriers, whereas the positions are predetermined given the number of reserved subcarriers. Accordingly, determining whether or not a particular subcarrier is a reserved subcarrier or not implies the determination of the position of this particular reserved subcarrier.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for coding data in a transmitted signal having subcarriers with orthogonal frequencies, comprising:
    modulating signals corresponding to a given subset of the subcarriers of the transmitted signal to encode input information; and
    modulating at least one signal corresponding to at least one reserved subcarrier depending on at least one optimization criterion relating to a quality of the transmitted signal, the at least one optimization criterion depending on at least one first quantity relating to a peak-to-average-power ratio of the transmitted signal and on at least one second quantity relating to an out-of-band power of the transmitted signal,
    wherein the transmitted signal is optimized such that power allocated to the reserved subcarriers is limited to a preset constant.

2. The method according to claim 1, wherein the reserved subcarriers are distributed over an available bandwidth of the transmitted signal.

3. The method according to claim 1, wherein the subcarriers and the reserved subcarriers of the transmitted signal are comprised in a band of subcarriers, wherein at least one subcarrier at each edge of the band of subcarriers is a reserved subcarrier.

4. The method according to claim 3, wherein at least two neighboring subcarriers at an edge of the band are reserved subcarriers.

5. The method according to claim 1, wherein the first preset constant corresponds to a number of reserved subcarriers multiplied with an average power allocated to one of the subcarriers of the subset of subcarriers carrying the information.

6. The method according to claim 1, wherein the second preset constant corresponds to a given factor times an average power allocated to one of the subcarriers of the subset of subcarriers carrying the information.

7. A method for coding data in a transmitted signal having subcarriers with orthogonal frequencies, comprising:
    modulating signals corresponding to a given subset of the subcarriers of the transmitted signal to encode input information; and
    modulating at least one signal corresponding to at least one reserved subcarrier depending on at least one optimization criterion relating to a quality of the transmitted signal, the at least one optimization criterion depending on at least one first quantity relating to a peak-to-average-power ratio of the transmitted signal and on at least one second quantity relating to an out-of-band power of the transmitted signal, wherein
    the transmitted signal is optimized finding an extremum of a weighted sum of the at least one first quantity and the at least one second quantity.

8. The method according to claim 7, wherein a weight of the at least one first quantity and a weight of the at least one second quantity are selected depending on at least one parameter relating to a current situation.

9. The method according to claim 8, wherein the transmitted signal is optimized by varying the weight of the at least one first quantity and the weight of the at least one second quantity.

10. A method for coding data in a transmitted signal having subcarriers with orthogonal frequencies, comprising:
    modulating signals corresponding to a given subset of the subcarriers of the transmitted signal to encode input information; and
    modulating at least one signal corresponding to at least one reserved subcarrier depending on at least one optimization criterion relating to a quality of the transmitted signal, the at least one optimization criterion depending on at least one first quantity relating to a peak-to-average-power ratio of the transmitted signal and on at least one second quantity relating to an out-of-band power of the transmitted signal, wherein
    the at least one first quantity relating to the peak-to-average-power ratio is a maximum power of the signal to be transmitted.

11. A method for coding data in a transmitted signal having subcarriers with orthogonal frequencies, comprising:
    modulating signals corresponding to a given subset of the subcarriers of the transmitted signal to encode input information; and
    modulating at least one signal corresponding to at least one reserved subcarrier depending on at least one optimization criterion relating to a quality of the transmitted signal, the at least one optimization criterion depending on at least one first quantity relating to a peak-to-average-power ratio of the transmitted signal and on at least one second quantity relating to an out-of-band power of the transmitted signal, wherein
    the at least one second quantity relating to the out-of-band power of the transmitted signal is determined dependent on a power of the signal to be transmitted in at least one optimization-point-frequency outside a band of frequencies assigned to the subcarriers of the transmitted signal.

12. The method according to claim 11, wherein the at least one second quantity is determined dependent on an average power of at least two frequencies of the transmitted signal.

13. The method according to claim 1, further comprising determining a position of the at least one reserved subcarrier within a bandwidth of the transmitted signal depending on an optimization criterion.

14. A method for coding data in a transmitted signal having subcarriers with orthogonal frequencies, comprising:
    modulating signals corresponding to a given subset of the subcarriers of the transmitted signal to encode input information;
    modulating at least one signal corresponding to at least one reserved subcarrier depending on at least one optimization criterion relating to a quality of the transmitted signal, the at least one optimization criterion depending on at least one first quantity relating to a peak-to-average-power ratio of the transmitted signal and on at least one second quantity relating to an out-of-band power of the transmitted signal; and determining a position of the at least one reserved subcarrier within a bandwidth of the transmitted signal depending on an optimization criterion, wherein said position is determined based on weight factors describing the weight of the at least one first quantity and of the at least one second quantity in the optimization criterion.

15. A method for coding data in a transmitted signal having subcarriers with orthogonal frequencies, comprising:

modulating signals corresponding to a given subset of the subcarriers of the transmitted signal to encode input information;

modulating at least one signal corresponding to at least one reserved subcarrier depending on at least one optimization criterion relating to a quality of the transmitted signal, the at least one optimization criterion depending on at least one first quantity relating to a peak-to-average-power ratio of the transmitted signal and on at least one second quantity relating to an out-of-band power of the transmitted signal;

determining a position of the at least one reserved subcarrier within a bandwidth of the transmitted signal depending on an optimization criterion; and signaling the position of the at least one reserved subcarrier together with the transmitted signal.

16. The method according to claim 13, further comprising determining a number of reserved subcarriers.

17. A method for coding data in a transmitted signal having subcarriers with orthogonal frequencies, comprising:

modulating signals corresponding to a given subset of the subcarriers of the transmitted signal to encode input information;

modulating at least one signal corresponding to at least one reserved subcarrier depending on at least one optimization criterion relating to a quality of the transmitted signal, the at least one optimization criterion depending on at least one first quantity relating to a peak-to-average-power ratio of the transmitted signal and on at least one second quantity relating to an out-of-band power of the transmitted signal; and determining a position of the at least one reserved subcarrier within a bandwidth of the transmitted signal depending on an optimization criterion, wherein the position of the at least one reserved subcarrier and/or the number of reserved subcarriers is determined based on at least a distance between a signal transmitter transmitting the transmitted signal and a station receiving the transmitted signal.

* * * * *

UNITED STATES PATENT AND TRADEMARK OFFICE
CERTIFICATE OF CORRECTION

PATENT NO. : 8,442,148 B2
APPLICATION NO. : 12/450188
DATED : May 14, 2013
INVENTOR(S) : Meik Doerpinghaus et al.

It is certified that error appears in the above-identified patent and that said Letters Patent is hereby corrected as shown below:

Title Page Col. 2 (Other Publications), Line 11, Delete "Digree" and insert -- Degree --, therefor.

Title Page 2 Col. 1 (Other Publications), Line 3, Delete "GOBECOM" and insert -- GLOBECOM --, therefor.

Title Page 2 Col. 2 (Other Publications), Line 14, Delete "Extensionin" and insert -- Extension in --, therefor.

In the Claims

Column 14, Line 4, In Claim 7, delete "optimized" and insert -- optimized by --, therefor.

Signed and Sealed this
Twenty-seventh Day of August, 2013

Teresa Stanek Rea
*Acting Director of the United States Patent and Trademark Office*